July 30, 1957 H. A. HOWELL ET AL 2,801,293

MAGNETIC TRANSDUCER HEAD

Filed Jan. 16, 1952 3 Sheets-Sheet 1

INVENTORS:
Hugh A. Howell and
Harold W. Bauman
BY [signature]
[signature]
Attorneys July 30, 1957 H. A. HOWELL ET AL 2,801,293

MAGNETIC TRANSDUCER HEAD

Filed Jan. 16, 1952 3 Sheets-Sheet 2

INVENTORS:
Hugh A. Howell &
Harold W. Bauman
BY [signature]
[signature]
Attorneys July 30, 1957 H. A. HOWELL ET AL 2,801,293

MAGNETIC TRANSDUCER HEAD

Filed Jan. 16, 1952 3 Sheets-Sheet 3

INVENTORS:
Hugh A. Howell &
Harold W. Bauman

BY [signature]
[signature]
Attorneys

United States Patent Office 2,801,293

Patented July 30, 1957

2,801,293

MAGNETIC TRANSDUCER HEAD

Hugh A. Howell, Berwyn, and Harold W. Bauman, Chicago, Ill., assignors to Ampro Corporation, Chicago, Ill., a corporation of Illinois Application January 16, 1952, Serial No. 266,768

14 Claims. (Cl. 179—100.2)

The present invention relates primarily to magnetic transducer heads that are used in magnetically recording on elongate, flexible magnetizable record bodies, as tapes or wires, or in reproducing from such bodies that previously have been recorded. In certain respects, as will be pointed out, the invention relates more broadly to small and low power electromagnetic inductance devices, such as transformers and choke coils.

There are certain magnetic circuit structural requirements for minimum attenuation of magnetic force energizing the magnetic circuit, and certain requirements of structural relation between magnetic and electrical circuit means for most efficient transfer of energy between them. In magnetic recording and reproduction there are additional requirements of the magnetic circuit structure defining the nonmagnetic transducing gap, for optimum recording magnetization of a record body traveling past the gap for recording, or for optimum magnetic energization of the magnetic circuit by the successive magnetic fields of a varyingly magnetized record body traveling past the gap for reproduction.

For minimum attenuation of magnetic force energizing a magnetic circuit, so that a maximum, intensity of such force delivered to the circuit is available for useful employment, the circuit should be as short and of as low reluctivity as possible. For optimum inductive transfer of energy in either direction between an electrical winding and a magnetic circuit core piece, the winding should have as many turns surrounding the core piece as is practical and as many turns per inch of the electrical conductor as is practical, and should be as closely linked to the magnetic circuit as is practical.

In magnetic recording and reproduction the formation of the magnetic circuit structure defining the nonmagnetic transducing gap is very important. The gap should be of very small length in the direction of record body travel for proper resolution of half waves of higher frequencies, although short circuiting tendencies of short gaps set a practical minimum of gap length. The extent of the interface of the gap, in the direction away from the record body, should be as small as practical, due to the necessity of producing magnetic fields that spray from the interface laterally into the record body in recording, and apparently reproduction also is adversely affected by an excess of interface extent in this direction. The gap-defining surfaces should be smooth and free of any projections that might concentrate magnetic field portions. Additionally those surfaces that define the gap interface itself should be as truly parallel, and preferably as close to planar, as is practical in commercial large-scale manufacture.

The distance of extent of the magnetic circuit structure surfaces from the gap in the direction of record body travel have a marked effect on resolution of the magnetic fields in recording, and in intensity of response in reproduction. The gap should have a length in the direction of record body travel of the order of one-half of the length of record body required to record one cycle of the highest frequency to be recorded or reproduced. When magnetic pole pieces have material extent from the gap in the directions of record body travel they tend to resolve, at certain frequencies, magnetic fields extended between points of the magnetic circuit structure spaced from the gap at different distances, rather than resolving them between the polar surfaces alone. Such resolutions result in so called "bumping," that is, sharply increased intensity of recording and reproduction at certain frequencies, or in distorting or diminishing intensity of true magnetic recordings.

Transducer heads constructed in accordance with the principles of the present invention provide very marked improvements over earlier head types in characteristics tending to produce optimum recording and reproduction. More broadly, inductive circuit components constructed as hereinafter disclosed present great advantages in magnetic circuit structural arrangement and in efficiency of coupling between magnetic circuit and electrical winding elements.

Figures 1, 2, 2A, 14, 15, 16, 17, 18:
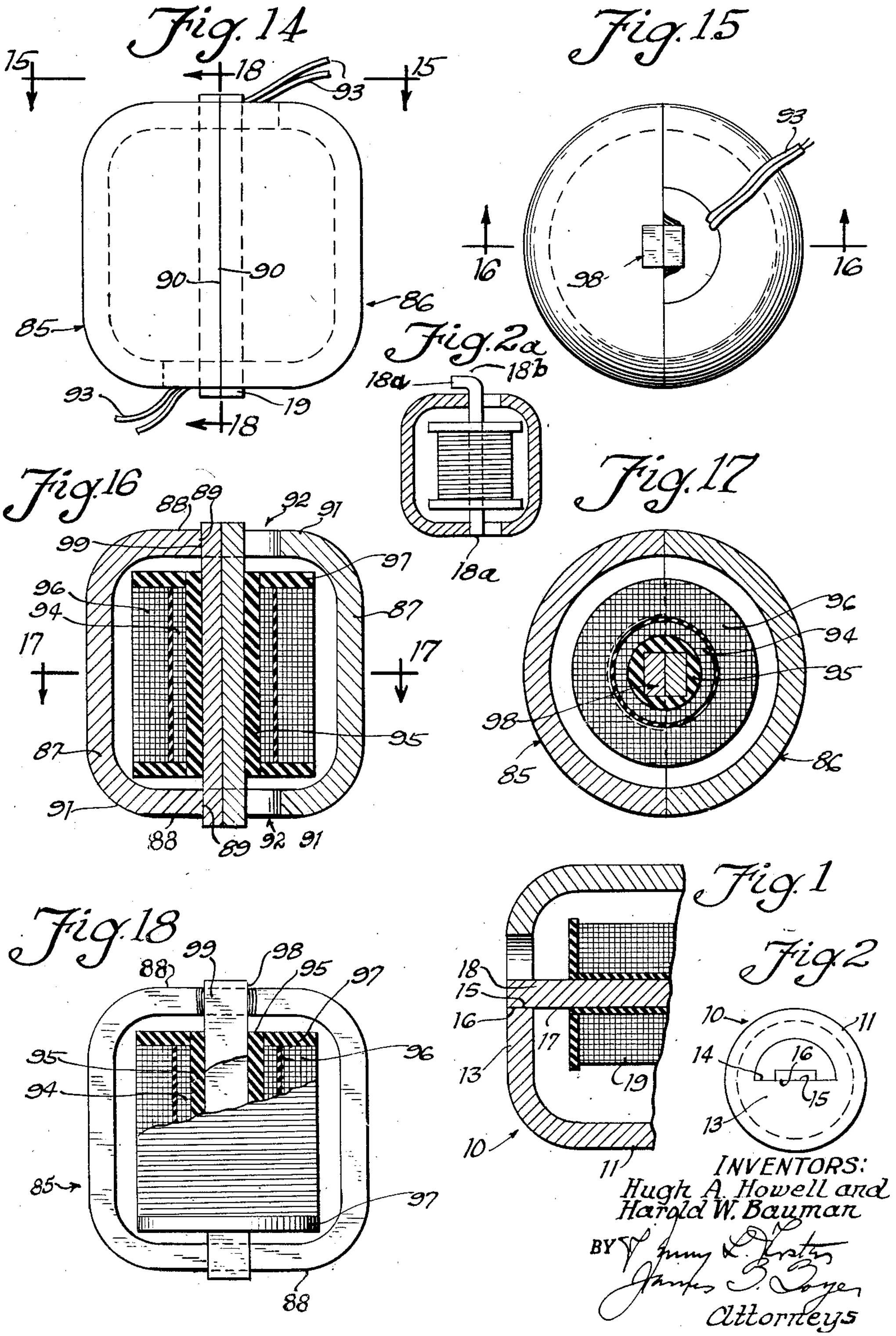
Fig. 1 is a median longitudinal section through an end of an electromagnetic inductive device disclosing an important feature of the invention.
Fig. 2 is an end elevation of such a device.
Fig. 2A is a median longitudinal section through a modified form of device.
Fig. 14 is a plan of a transformer embodying the invention.
Fig. 15 is an elevation from the plane of line 15—15 of Fig. 14.
Fig. 16 is a section on line 16—16 of Fig. 15.
Fig. 17 is a section on line 17—17 of Fig. 16.
Fig. 18 is a section on line 18—18 of Fig. 14.
Figure 3:
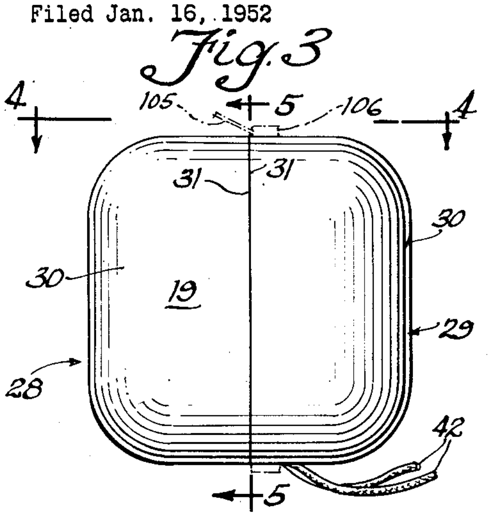
Fig. 3 is a plan of a magnetic transducer head embodying the invention.
Figure 4:
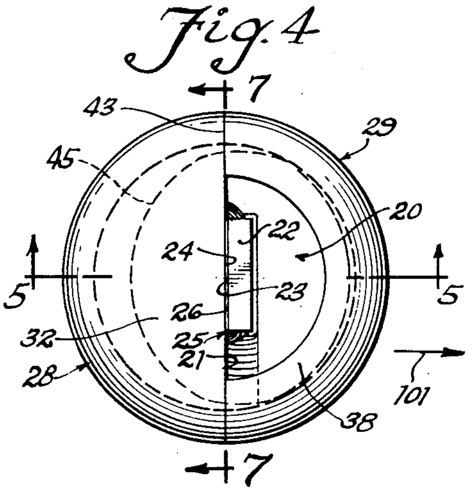
Fig. 4 is a front end elevation thereof.

First describing a magnetic circuit structure detail which is employed in various specific forms of electromagnetic devices arranged in accordance with the invention, and first referring to Figs. 1 and 2, reference numeral 10 indicates an end fragment of an element that acts as a structural part as well as a magnetic circuit member of the device. This element is formed of highly magnetically permeable metal, and includes a sidewall structure 11 that is transversely shaped to tubular form. Element 10 also has an end wall portion 13 formed intergral with the side wall and that provides an edge 14. At least a portion 15 of edge 14 has a surface having a configuration for parallel, facing relation to a portion 16 having a corresponding form and provided by a lateral surface 17 of a magnetically permeable core piece 18. Preferably the facing surface portions 15, 16 are flat.

The overlying relation between core piece 18 and the shell end wall edge 14, and the parallel facing relation of portion 16 of a lateral core piece surface to the end wall edge portion 15, constitutes an important aspect of the invention. A generally similar arrangement is provided at the opposite end of the device, and includes a second lateral surface portion of the core piece disposed in parallel, facing relation to an edge surface of a second end wall. The details of the second end structure may vary considerably, depending partly on the specific service for which the device is intended, and partly on manufacturing considerations, and several forms are shown in the drawings.

In Fig. 2A is shown a modification of the arrangement of Figs. 1 and 2. In this arrangement, in order to reduce energization of the core piece 18 by stray magnetic fields, its opposite end surfaces 18*a* are relatively displaced from their normal parallel, oppositely facing end linearly spaced relation, to avoid the normal orientation with magnetic field lines presented by the ends of a straight body. To this end at least one of the end surfaces is displaced laterally of the core piece and is placed in an offset angular relation to the opposite end surface. This may be accomplished by providing the core piece with at least one end portion 18*b* extended from the shell and bent laterally.

A magnetic transducer head arranged according to the invention is shown in Figs. 3 to 8. The head comprises a tubular shell 19 of magnetically permeable material, having at its front end an end wall structure provided with an opening 20 that at one side is defined by an edge 21 that preferably is straight and flat. A pole piece 22 of magnetically permeable material, preferably of rectangular cross section, having a width corresponding to width of a record body track with which the head is to cooperate and of very limited thickness, of the order of a few one-hundredths inch, has an end portion extended into opening 20, and a flat portion 23 of one of the broader lateral surfaces of the pole piece overlies and is parallel to a portion 24 of the flat surface of edge 21. The surface portions 23, 24 are spaced apart to provide a nonmagnetic transducing gap 25, preferably by a thin, flat body 26 of nonmagnetic and low permeability material. Within shell 19, pole piece 22 is encircled by an electrical winding 27 that is surrounded by the shell, and to the opposite end of winding 27 from gap 25 the pole piece is secured in as close contact as practical with the shell. At the front end of the shell the shell structure defining the edges of opening 20, other than edge 21, are spaced from the pole piece at distances much greater than the length of gap 25, that is the distance between the gap-defining surface portions 23, 24. The pole piece may be either a single piece of material as in Figs. 4 to 7, of plural laminations disposed transverse to the directions of the record body path and with a broader transverse surface of an outer lamination providing the gap-defining surface 23, as in Fig. 8, or it may comprise plural stacked laminations with edges in registration to provide a flat surface, a portion of which provides surface 23, as in Fig. 8A.

Now describing a preferred detailed head arrangement, also disclosed by Figs. 3 to 8, shell 10 comprises a pair of half shell sections 28, 29, each of which includes a side wall 30 that is transversely formed to a semitubular shape, which may be the illustrated semicylinder, and to provide a pair of spaced longitudinal edges 31, the corresponding edges 31 of the respective sections being secured together in matched contacting relation in the shell assembly.

At the gap end of the head, one of the shell sections, shown as 28, is provided with an end wall portion that provides the gap-defining edge surface portion 24, and that preferably is a complete shell section end wall 32, formed integral with the side wall 30 of section 28 and the edge 21 of which extends straight and flat the full distance between the side wall edges 31. Preferably the longitudinal side wall and end wall edges 31, 21 of shell section 28 are all flat and coplanar, since they may be quickly and easily brought to that condition by moving the shell over a flat, fine abrasive surface with edges 21, 31 all in contact with it. Additionally, the accurate, flat condition of edge 21, and particularly its gap defining surface portion 23 permits ready accomplishment of the desirable parallel relation to it of the facing lateral surface portion 24 of the pole piece, which surface portion also may be easily brought to an accurately flat and polished condition by rubbing it against a flat abrasive surface.

The attachment of the pole piece to the shell beyond the end of winding 27 opposite that adjacent gap 25 preferably is provided by a second face-to-edge relation between a lateral surface portion of the pole piece and a shell section end wall.

To this end, one of the shell sections is provided with an end wall portion providing an edge 33, and preferably this wall portion comprises a second complete half section end wall 34, formed integral with the side wall of the section to which it belongs, and the edge 33 of which is straight, flat and coplanar with the longitudinal side wall edges 31 of that section. This edge 33 provides an edge surface portion 35 that a second parallel lateral surface portion 36 of pole piece 22 overlies, such arrangement being advantageous for the practical manufacturing reason of readiness of accurate finishing and ready assembly set forth above. Additionally, it is preferable that end wall 34 be a part of the same half shell section, here 28, as is end wall 32, since this permits all edges of that section to be simultaneously worked to accurate coplanar and polished condition by the indicated procedure, and additionally makes it possible to accomplish accurate, substantially parallel relation between the respective edge surface portions 24, 35 and overlying lateral pole piece surface portions 23, 36 that are provided by a single lateral surface 37 of pole piece 22, which itself may be easily and quickly brought to an accurately flat and polished condition, and bridged between the coplanar edges of the different end walls.

At the gap end of the head, opening 20, which provides clearance for the end portion of pole piece 22 that overlies the end wall edge portion 23, and also spaces the shell structure from the pole piece sufficiently to prevent material spraying of the magnetic field from the pole piece to the shell except across the transducing gap 25, is provided by an end structure of the shell not having the complete, gap-defining end wall 32, that is, opening 20 is provided by shell section 29. As shown, this end structure may comprise an incomplete end wall portion 38 having therein a lateral recess that in the shell assembly provides the opening. At the rear end of the shell an opening 40 is provided to accommodate the rear end portion of pole piece 22. This opening is provided by the shell section not having the end wall 34 that provides the edge portion 35 which the second lateral pole piece surface portion 36 contacts, and in the specific form shown comprises a second incomplete end wall 41 of the second half shell section 29, also formed integral with the sidewall 30 of that section. The rear opening 40 also provides clearance for winding lead wires 42, as shown. Preferably the edges 43 of the incomplete shell section end walls are coplanar with the side wall edges 31 of the section providing them, since such edges may be brought readily to such a condition and polished, and thereby made to have close contact with matching portions of the end wall edges of the opposed section. Such close contact provides for a strong shell assembly, and one that is tightly closed, which is useful for the shielding function of the shell, which will be described later.

At stated, pole piece 22 is preferably of a rectangular cross section, of a width determined by width of record track area, and of relatively small thickness as compared to width. Winding 27, which encircles the pole piece and is surrounded by the shell, is wound with its inner turns closely conforming to the periphery of the pole piece, preferably on a bobbin comprising a core 44 that closely surrounds the pole piece, and spool ends 45.

A different type of magnetic transducer head is shown by Figs. 9 to 12, this head being adapted to recording on or reproducing from separate parallel track areas extended side by side along a tape-form magnetic record body. Separate pole pieces 50, 51 are provided, each having a gap-defining end portion 52 and those portions being relatively positioned for respective cooperation with the different ones of a pair of tape-form record body track areas.

The head is a tubular body made up of a pair of half sections 53 which in this case are duplicates, each having a side wall 54 that is transversely formed to provide a pair of edges 55 that have coplanar surfaces, and each section having front and rear partial end walls 56, 57 that are formed integral with the side wall 54 and that provide clearance apertures 58. Flat edge surface portions 59 of the shell section end walls face and are parallel to lateral surface portions 60 of the respective pole pieces 50, 51. At the front end of the head assembly the pole piece lateral surface portions 60 and the end wall edge portions 59 are spaced apart, as by nonmagnetic bodies 62, to provide transducing gaps 63. At the rear end of the head the facing surfaces 59, 60 are maintained in close surface to surface contact. Windings 64, 65 respectively encircle the different pole pieces 50, 51, and both are enclosed laterally by the shell section side walls 54 and partially at the ends by the partial end wall portions 56, 57.

Figure 13:
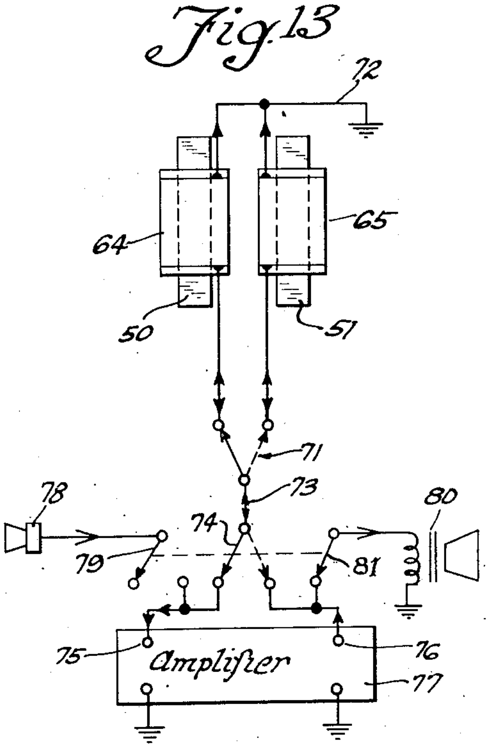
Fig. 13 is a schematic diagram of a circuit for using the dual track head of Figs. 9 to 12.
Figure 12:
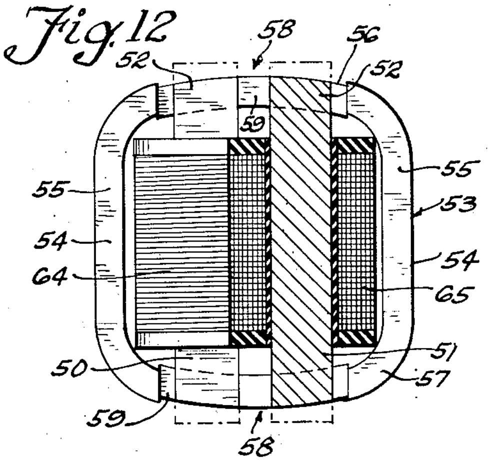
Fig. 12 is a section on line 12—12 of Fig. 10.

The dual core head of Figs. 9 to 12 may be employed for simultaneous recording on or reproducing from two side by side record tracks, or may be used to record on or reproduce from the different ones of such tracks respectively during travel of the record tape in opposite directions. In the latter case a switching system such as that shown in Fig. 13 may be employed. In this switching arrangement either winding 64 or 65 may be connected, by means of a selector switch 71, between a return lead 72 and an energized common lead 73. The common lead 73 may be connected selectively by means of a switch 74, with either the signal input 75, for reproduction, or the output 76, for recording, of an amplifier 77. A signal source device, as microphone 78 may be connected to and disconnected from the amplifier signal input 75 by a switch 79 ganged with switch 74 to correlate such connection and disconnection respectively with connection of the common lead 73 to output 76 and input 75. Similarly, a reproducing output device, as speaker 80, may be connected with and disconnected from amplifier output 76 by a switch 81 ganged with switch 74 to correlate such connection and disconnection respectively with connection of lead 73 with the amplifier input and output 76. Thus the switching system provides for recording energization of either winding 64, 65 by amplifier output 76 when the amplifier is driven by device 78, or for application of signal voltage to the amplifier input 75 from either winding 64, 65 to drive output device 80.

Figs. 14 to 18 show a transformer, typically a small low level impedance-matching transformer having the general shell and pole piece arrangement previously described, but arranged to provide as continuous a magnetic circuit as is practical. The transformer comprises a pair of half shell sections 85, 86 each having a transversely formed side wall 87. Formed integral with the side wall of one section 86 are complete end walls 88 each having a straight edge 89 that is polished flat and coplanar with the side wall edges 90, while the other end walls 91 of the other section 87 have clearance openings 92 for lead wires 93.

The winding system of the transformer comprises a low voltage and low impedance winding 94, shown as wound next to core 95, and a high voltage, high impedance winding 96 shown as wound over the first winding. Together with core 95, a pair of spool ends 97 form a bobbin which surrounds a core piece 98. Pole piece 98 preferably is laminated, as shown, and is mounted in the shell with portions of its broader surfaces 99 overlying and in as close as practical surface to surface contact with the straight edges 89 of the complete shell section end walls 88.

An extremely important feature of the invention, as it relates to electromagnetic inductive devices in general, is the half shell section and pole piece arrangement providing an overlying and facing relation between parallel portions of the edge surfaces of shell section walls and lateral surface portions of a core piece. The side-to-edge relation between the pole piece and shell wall insures registration between shell and pole piece surfaces, without requiring the painstaking, often improperly or incompletely accomplished registration that must be performed when an edge-to-edge or end-to-edge relation between a core piece and a shell is employed. Another, closely related feature of importance of the invention is the coplanar relation of the shell section wall edges, and the opposition of lateral flat core piece surface portions to portions of such coplanar edges. Polishing of the shell section edges to an accurate coplanar relation, and to a smooth condition, is readily accomplished by rubbing the shell section edges over a flat abrasive surface, and similarly the core piece lateral surface portions may be brought to accurately flat and polished condition by rubbing the core piece on a flat abrasive surface. The use of a shell section having coplanar, polished edge surfaces, and a core piece having flat, polished surface portions positioned in overlying, facing relation to portions of the shell section edges provide for accurate parallel relation between the facing pole piece and shell section surface portions without requiring painstaking adjustment. A special advantage is obtained when the suggested arrangement of Figs. 3 to 7 is employed. In this type of arrangement both of the core piece-facing end wall edges are provided by end walls of a single shell section, and so are coplanar. The core piece surface portions that face the end wall edges are provided by a single flat and polished lateral surface of the straight core piece. The bridging of the coplanar shell section end wall edges by the flat pole piece surface insures parallel relation between the facing pole piece and end wall edge surfaces. This results in a uniform, close contact between pole piece and shell surfaces when the junction is intended to be as close as practical for magnetic circuit continuity, and in the case of a nonmagnetic transducer gap it assures the highly desirable parallel condition between the gap-defining surfaces. A similar condition exists in the arrangement of Figs. 9 to 12, wherein the recessed end wall edges 59 can be brought to coplanar condition by a rigid flat-surfaced abrading tool bridged between the recessed end wall edges and rubbed over both at once.

In addition to the above-noted advantages, the formation of the shell sections with transversely formed side walls and integral end wall portions provides such shell sections with great strength, rigidity and resistance to mechanical injury, so that they are not readily damaged in handling, processing, assembly, mounting or service. Consequently the shell sections may be made of thin stock, as will be described below in detail.

Figure 5:
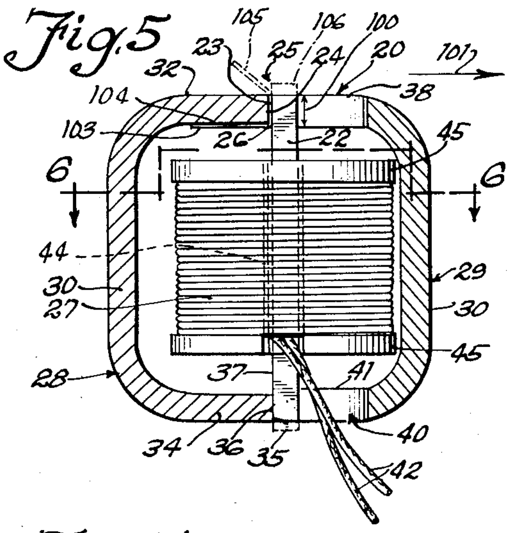
Fig. 5 is a section on line 5—5 of Fig. 4.
Figure 6:
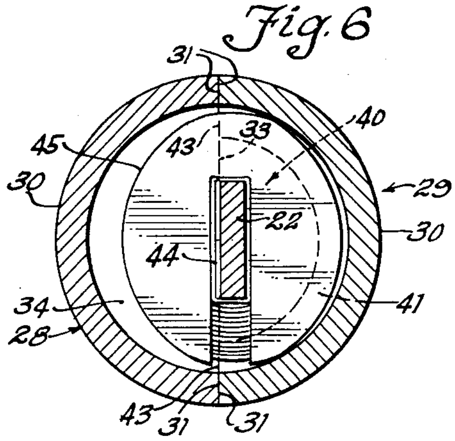
Fig. 6 is a section on line 6—6 of Fig. 5.
Figure 7:
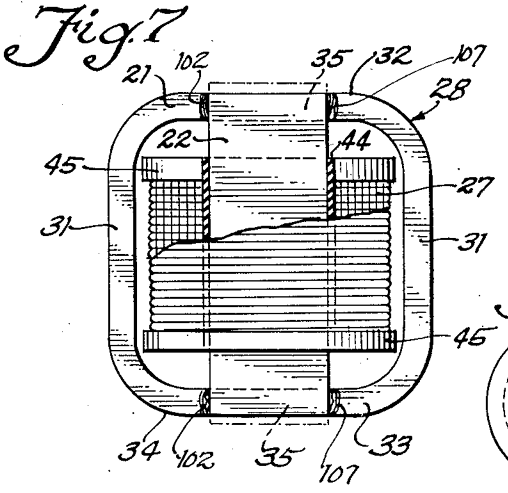
Fig. 7 is a section on line 7—7 of Fig. 4.
Figures 8, 8A:
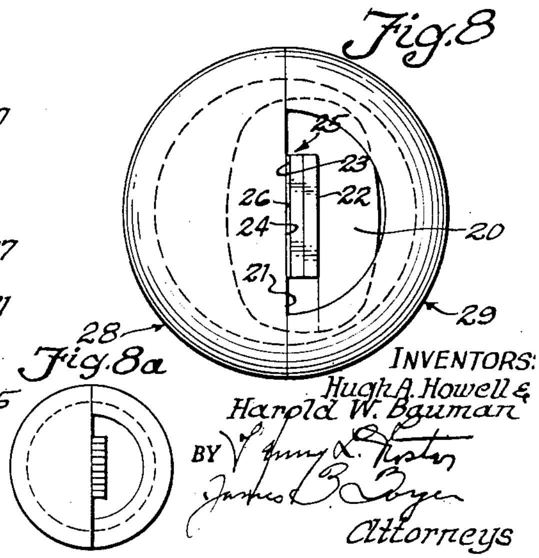
Fig. 8 is an end elevation of a slightly modified transducer head.
Fig. 8A is an end elevation of a different slightly modified transducer head.
Figure 9:
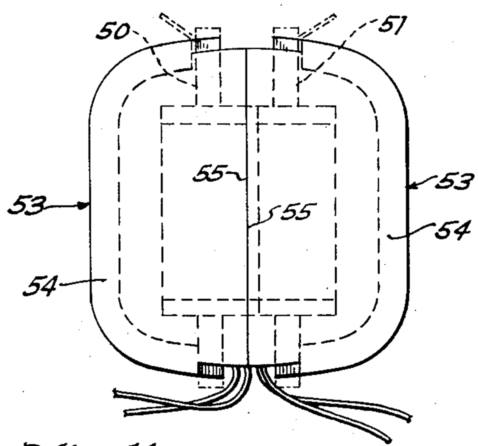
Fig. 9 is a plan of a special head for cooperation with two record track areas of a tape-form record body.
Figure 10:
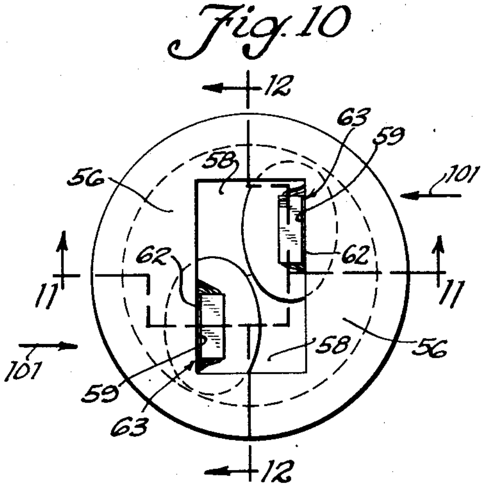
Fig. 10 is a front end elevation thereof.
Figure 11:
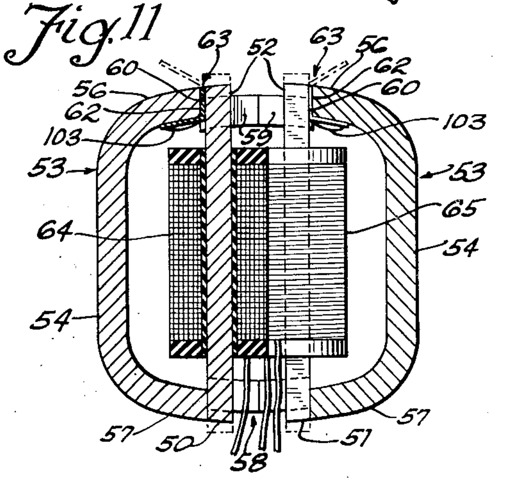
Fig. 11 is a section on line 11—11 of Fig. 10.

The face to edge relation between a lateral core piece surface and a shell edge provides a very important special advantage in magnetic transducer heads, which is the accuracy and uniformity of gap structure that it provides, and the possibility of limiting the interface depth of the gap, that is, the extent of the gap-defining surfaces in a direction away from the path of a record body past the gap. This dimension, which is indicated at 100 in Fig. 5, is fixed by the thickness of the shell section end wall, and by reason of the transversely formed side and integral end wall formation of the tube, the entire shell including the gap-defining end wall may be very thin without resulting mechanical weakness of the shell structure, Thinness of magnetic circuit elements maintains iron losses at a lower lever than that of iron losses in heavier gauge elements, and thereby contributes improvement in higher frequency response of the head being described as compared with conventional heads having massive magnetic iron circuit structures. As suggested above, the edge-to-face relation between the end wall and a lateral pole piece surface eliminates difficulty in accomplishing accurate registration between the surfaces that define the opposite sides of the gap.

It is to be noted that in a transducer head constructed as herein described the end surface of the rectangular pole piece, corresponding to its cross section, faces the record body path, and the thickness of the pole piece determines the extent of the pole piece from the gap and in the direction of the record body path. As will be set forth in detail, the pole piece may be very thin, so that the distance that it extends along the record body path is small. In service the record body preferably travels across the front end of the transducer head in a direction to approach the gap across the outer surface of the end wall having the edge portion that defines the transducing gap, the preferred directions of record body travel for the gaps of Figs. 4, 5 and 10 being shown by arrows 101 in those figures. This preferred direction of record body travel is due to the tendency of the relatively broad outer end wall surface to resolve magnetic fields at certain frequencies between the pole piece end and points on the end wall surface spaced from the gap edge. If the record body approaches the gap from the pole piece side such fields may diminish the intensity of or otherwise distort recordings previously made by fields resolved between the gap-defining surfaces. Spurious recordings by such fields are not of great intensity and if they are impressed on a record prior to its crossing a gap energized by mixed audio and high bias frequencies, they are practically destroyed. Since the end surface of the thin pole piece presents little surface for development of these spurious fields, the indicated record approach from the section end wall side of the gap is regarded as preferable.

Further referring to general considerations of magnetic transducer heads, the shell and pole piece arrangement herein disclosed, and certain winding details to be described, lend themselves to production of a new type of head, of small size but high efficiency as compared to previous heads, and having exceedingly satisfactory operating characteristics. In a typical head of the new small type, and arranged as shown in Figs. 3 to 8, the shell made up of the half sections 28, 29 may have external length and diameter of the order of one-quarter inch each, and they may be made of sheet or strip stock of one of the conventional iron-nickel-copper or other high permeability, low remanence alloys commercially available under various trade-names. Suitable stock thickness for the shell sections for best practice of the invention lies in a range of the order of from fifteen to thirty one-thousandths inch, and may be selected to correspond to a desired gap interface depth (dimension 100 in Fig. 5). Stock of the alloys in question and of a thickness lying in the indicated range is readily formed to the half shell section form by standard punch and die practice. Preferably the shell section side walls are transversely curved to give the sections a substantially semicylindrical form, and this form, with integral complete or partial end wall portions gives both adequate mechanical strength and rigidity, and adequate magnetic characteristics to the shell structure formed of a pair of the half sections.

The pole piece for such a head may be of the same high permeability alloy stock of the same range of thickness, not necessarily matching the shell section thickness, and of a width corresponding to the width of the record body track area with which the head is to cooperate. For example, for cooperation with one of two side by side track areas of a standard tape-form record body one-quarter inch wide, a pole piece width within normal tolerance of eighty-five one-thousandths inch is satisfactory. Such a pole piece has been found to have magnetic permeance adequate for transducer head purposes, and also to have satisfactory mechanical strength when assembled with and enclosed by a shell in the indicated manner.

The small cross section of core piece which, due to the excellent magnetic circuit characteristics of its face-to-edge relation with shell walls, may be employed in small, low power electromagnetic inductive devices in general, also contributes to arrangement of a peculiarly effective electromagnetic coupling between the magnetic circuit provided by the shell and core piece assembly and an electrical winding encircling the core piece and enclosed by the shell. The small periphery of the core piece permits a relatively large number of winding turns per unit length of winding wire, and the enclosure of a relatively large number of turns by a shell of given cross sectional dimensions, particularly when the innermost windings are wound in close conformity with the core piece periphery. Additionally, the close surrounding of the core piece by turns so wound provides very close coupling between the winding system and the core piece. Transducer heads having the indicated quarter inch by quarter inch shell dimensions, and shell thickness and pole piece width and thickness in the indicated dimensional orders will accommodate windings of the order of one hundred seventy-five turns of number thirty-eight copper wire.

The impedance of a transducer head of the indicated small size and having the winding specifically set forth is of the order of thirty-five to fifty ohms, depending on winding tightness, at a frequency of one thousand cycles per second.

Since an impedance of this order constitutes a bad mismatch for the impedances of a vacuum tube electronic amplifier, it is necessary to employ impedance-matching means, which may be a simple impedance matching transformer connected between the head winding and the amplifier. By actual testing of a number of heads of the specific dimensions, structural arrangement and winding details set forth above, with the head windings connected with the primary, low impedance windings of impedance-matching transformers having a primary to secondary turns ratio of the order of one to seventy, and with the above-described heads paired with commercially produced conventional heads, and with the same standard test record body passing the paired heads successively, the outputs of the transformer secondaries were found to exceed those of the conventional heads consistently by at least fifteen millivolts. The impedances of the conventional heads and of the matching transformer secondaries both satisfactorily matched the signal input impedance value of conventional vacuum tube amplifiers.

It is, of course, to be understood that the transducer head arrangements described above are not limited to small, low impedance type heads; and that the same structural, manufacturing and operating advantages are presented by larger heads wherein the winding may be selected to provide a desired impedance, and the shell size may be selected readily to accommodate the winding. However, there are many fields of service wherein a transducer head of small size is required or desirable. Furthermore, the size of any inductive device has a direct relation to intensity of noise or hum-producing energization by stray magnetic fields, since such intensity is a function of the number of magnetic field force lines cut by the winding, and the number of stray field force lines intercepted by the magnetic circuit structure of the devices and directed through the winding is directly related to the size of the device. In this connection it may be noted that the substantially complete enclosure of the winding by the shell tends to shield the winding and limit its energization by stray fields. It may also be noted that the small, low impedance windings lend themselves to a compact dual head arrangement such as that of Figs. 9 to 12, with its nonmagnetic transducer gaps relatively positioned for respectively cooperating with the different, narrowly spaced track areas of a tape-form record body.

Assembly of a head of the described arrangement, whether of the small low impedance type specifically set forth or of larger size, may be, and in the case of the low impedance heads mentioned above was, by soldering the rear end of the pole piece to the end wall edge that it overlies, the bobbin and winding having previously been mounted on the pole piece. This soldering appears at 102, Fig. 7. Conveniently the non-magnetic shim 26 of Figs. 4 and 5, also designated 62 in Figs. 9 and 10, may be applied as a strip having an inner end 103 bent into contact with and cemented to the inner surface of the shell section end wall at 104, and an outer end 105. Preferably the pole piece is formed slightly longer than the shell, to provide an end 106 that projects from the gap end of the head assembly. This end and the outer end of the shim are removed in a final end polishing operation by means of which the end surface of the pole piece, the shim end and the outer surface of the gap-defining shell section end wall are brought to a true flush relation. The front or gap-defining end of the pole piece is secured to the straight edge of the gap-defining front end wall by drops 107 of solder adhered to the edges of the pole piece and the adjacent end wall edge.

Alloys of the high permeability iron-nickel-copper type do not solder well, but it has been found that after electrolytic cleaning the shell and pole piece surfaces can be copper plated easily, and the copper plating provides an excellent surface for solder adhesion. The copper plated half shell sections may be soldered together.

From the foregoing, the types of arrangement and the many advantages in manufacture, assembly and operating characteristics of the herein-described invention will be evident. It is to be understood that the scope of the invention is measured solely by the appended claims, rather than by the preceding exemplary descriptions.

We claim:

1. An electromagnetic inductive assembly comprising a tubular shell of assembled half shell sections of magnetically permeable material and each including a transversely formed side wall of semitubular form and providing a pair of longitudinal edges, said shell at each end having an end wall portion formed integral with one of said sections and providing a flat edge surface portion spaced inward from said side walls, a core piece extended through said tubular shell between the outer surfaces of said end wall portions and having a pair of flat lateral surface portions respectively parallel to and overlying the different ones of said flat edge surface portions, and an electrical winding system encircling said core piece between said end wall portions and surrounded by said side walls.

2. A magnetic transducer head comprising a tubular shell of magnetically permeable material, said shell at each end having end wall structure providing edge surface portions extended in transverse relation to the space enclosed by the shell, a pole piece of magnetically permeable material extended through the shell between said end wall structures and having a pair of lateral surface portions respectively parallel to and overlying the different ones of said edge surface portions, means securing said pole piece with one of said lateral surface portions in contact with the end wall edge surface portion that it overlies, a nonmagnetic body spacing the other said lateral surface portion from the end wall edge surface portion that it overlies to provide a nonmagnetic transducer gap between them, and an electrical winding surrounding said pole piece and surrounded by said shell.

3. A magnetic transducer head in accordance with claim 2, wherein said edge surface portions are substantially coplanar, and said pole piece has a substantially flat lateral surface that provides said lateral surface portions.

4. A magnetic transducer head comprising a substantially cylindrical shell having an outside diameter of the order of one-quarter inch and a length of the order of one-quarter inch, said shell comprising a pair of half sections of magnetically permeable metal of thickness in range of the order of from fifteen to thirty one-thousandths of an inch, each said section including a side wall transversely formed to substantially semicylindrical form and having a pair of coplanar edges and said sections being secured together in matched relation with said edges in contact, at one end of said shell one of said sections having an end wall formed integral with the side wall of that shell section and having a straight, flat edge that is coplanar with the said longitudinal edges of that section, at the opposite end of said shell one of said sections having an end wall that is formed integral with the side wall of that shell section and having a straight flat edge that is coplanar with said longitudinal edges of that section, a pole piece of rectangular cross section, of magnetically permeable material having a thickness in a range of the order of from fifteen to thirty-one-thousandths of an inch and a width of the order of eighty-five one-thousandths of an inch, said pole piece having a pair of its lateral broader surface portions respectively disposed in parallel, overlying relation to middle parts of said end wall edge surfaces, one of said lateral surface portions being secured in contact with the edge surface that it overlies to form a nonmagnetic transducing gap, and an electrical winding of copper wire of a size of the order of number thirty-eight and a number of turns of the order of one hundred seventy-five encircling said pole piece between said end walls and laterally surrounded by said section side walls.

5. A magnetic transducer head according to claim 4, wherein the respective said end walls are provided by the same one of said shell half sections, said pole piece is flat and straight and said surface portions are provided by the same one of the broader surfaces of said pole piece.

6. A magnetic transducer head for cooperation with a pair of laterally spaced track areas of a tape-form record body, said head comprising a shell of magnetically permeable material having a tubular sidewall and a front end wall having therein an opening defined at opposite sides by a pair of edges of said end wall, a pair of pole pieces disposed in said shell and respectively having end portions disposed in said opening in relative positions for registration of their ends with the different ones of such a pair of track areas, and each of said pole pieces having lateral surface areas which respectively are disposed parallel to, overlying and narrowly spaced from surface portions of the different said end wall edges to define therewith a pair of nonmagnetic transducer gaps.

7. A magnetic transducer head according to claim 6, wherein said end wall edges are straight and flat, said pole pieces are rectangular in cross section and are of widths respectively corresponding to widths of record body track areas with which they are to cooperate, said lateral surface portions are provided by lateral surfaces of said pole pieces that have said widths, and said pole pieces are spaced apart in the direction of said widths by a distance corresponding to the spacing between such record body track areas.

8. A magnetic transducer head according to claim 6, wherein said end wall edges are straight and flat, said shell has a second end wall at its end opposite said first end wall, said second end having a second opening defined at opposite sides by edges that are straight, flat and respectively coplanar with the different said edges that define said first opening, and wherein said pole pieces respectively have flat surfaces that respectively provide said lateral surface portions, and that also provide second lateral surface portions that are parallel to, overlie and are secured in contact with the different ones of said edges that define said second opening.

9. A magnetic transducer head comprising a pole piece of rectangular cross section having a width corresponding to the width of a record body track area with which the head is to cooperate, and of thickness less than said width, an electrical winding encircling said pole piece and having its innermost turns closely surrounding and conforming to the rectangular periphery thereof, said winding having a selected number of turns, and selected longitudinal and cross sectional external dimensions, and a shell enclosing said winding and pole piece, said shell having at one end an end wall portion having a straight flat edge surface portion disposed in parallel, facing relation to a portion of one of the broader surfaces of said pole piece, and narrowly spaced therefrom at a distance to provide a non-magnetic transducing gap of selected length, and said pole piece and shell being secured in close contact beyond said winding from said gap.

10. An electromagnetic inductive assembly comprising a pair of half shell sections of magnetically permeable material, each having a side wall transversely formed to provide a pair of longitudinal edges, and a pair of end wall portions integral with said side wall and at least one of which has a flat edge surface portion, said half sections being secured together with their said longitudinal edges in contact and with a pair of said flat edge surface portions respectively disposed at the opposite ends of the shell thereby formed, a core piece of magnetically permeable material extended through said shell between said end wall portions and having flat lateral surface portions parallel to, overlying and facing said flat edge surface portions, and an electrical winding system between said end wall portions, encircling said core piece and surrounded by said shell section side walls, said core piece having at at least one of its ends a portion extended beyond the adjacent said end wall and bent so as to an angular and offset relation between the respective ends of said core piece.

11. A magnetic transducer head according to claim 2, wherein said pole piece has an end portion extended beyond the outer surface of said end wall with the edge surface which said pole piece is in contact, said extended end portion being off bent and providing an angular and offset relation between the respective ends of said core piece.

12. A magnetic transducer head according to claim 2, wherein said pole piece comprises plural laminations of highly magnetic permeable material in stacked relation.

13. A magnetic transducer head according to claim 2, wherein said pole piece comprises plural stacked laminations of highly magnetically permeable material, and said lateral pole piece surface is provided by the transverse surface of an outer one of said laminations.

14. A magnetic transducer head according to claim 2, wherein said pole piece comprises plural stacked laminations of highly magnetically permeable material with corresponding edges in registration to form a flat surface, and said lateral pole piece surface comprises said flat surfaces.

References Cited in the file of this patent

UNITED STATES PATENTS 2,523,515 Porter ............... Sept. 26, 1950